Oct. 24, 1950     C. R. KUTIL     2,527,431
BICYCLE STABILIZER ATTACHMENT
Filed June 17, 1949
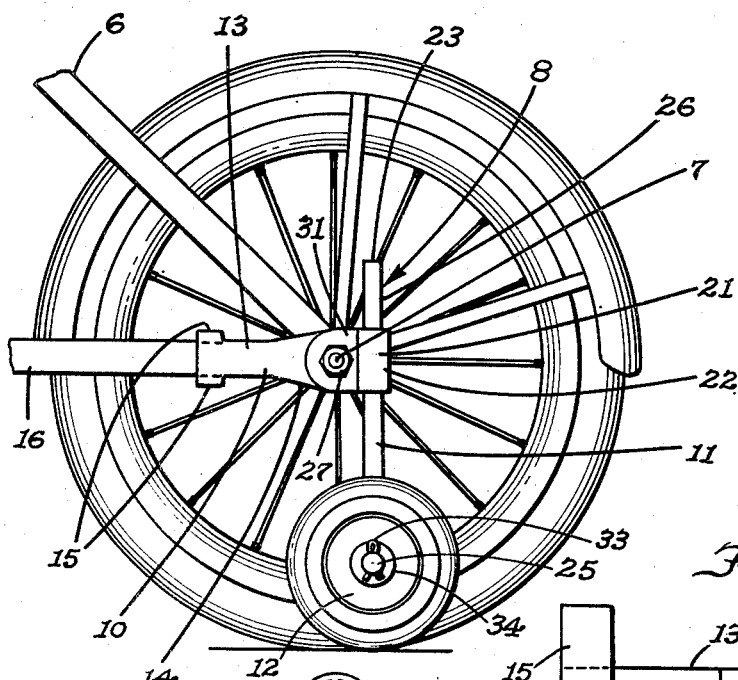
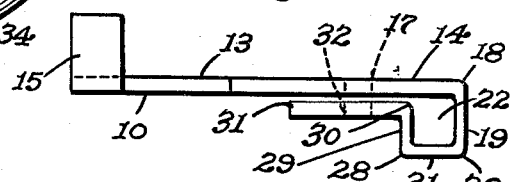
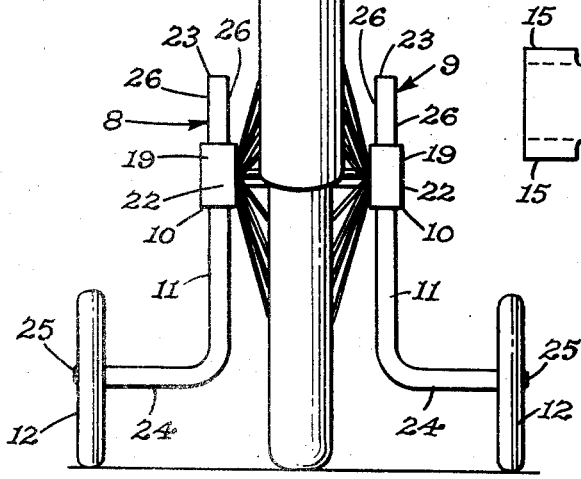
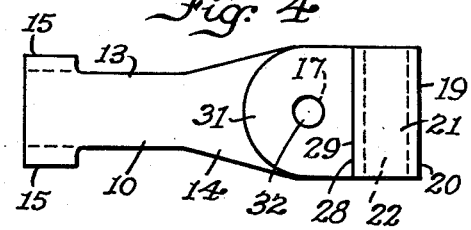
Inventor
Clyde R. Kutil
Andrew F. Wintercorn
Atty Patented Oct. 24, 1950

2,527,431

UNITED STATES PATENT OFFICE 2,527,431

BICYCLE STABILIZER ATTACHMENT

Clyde R. Kutil, Chicago, Ill., assignor to Atwood Vacuum Machine Company, Rockford, Ill., a corporation of Illinois Application June 17, 1949, Serial No. 99,632

14 Claims. (Cl. 280—293)

This invention relates to a new and improved bicycle stabilizer attachment, designed to be applied to the rear axle of a bicycle, to provide lateral support and thus prevent the bicycle tipping over, whereby to facilitate a child learning to ride a "two-wheeler" and to reduce to a minimum likelihood or injury to the child and damage to the bicycle.

The principal object of my invention is to provide a stabilizer attachment that is of such simple and economical construction that it may be readily applied to and later removed from the bicycle and either discarded or given away to some other user, the attachment representing such a small investment. This object is attained by forming each of a pair of such attaching brackets and the clamping means for the outboard wheel supporting standard from a single piece of sheet metal stamped and bent to the form desired. A further substantial saving in the cost of production of the attachment is realized by making the two wheel supporting standards separate instead of as integral arms on an inverted U-shaped yoke straddling the back wheel of the bicycle, so that much less rod material is required and a much better appearing attachment is obtained, the rod used in each standard having flats along its upper end portion to enable rigidly clamping the same at different elevations without likelihood of the standard having any tendency to turn, and the lower end portion of the standard being bent outwardly and providing an axle portion for the outboard wheel.

Another object is to provide an attachment of the kind mentioned which may be easily applied to a bicycle by the owner without the necessity for elaborate instructions, and which includes an adjustment feature enabling quick and easy adjustment as to elevation of the outboard wheels or rollers, in as small steps as may be desired, infinite adjustability being afforded with the present construction, so that as the child progresses in learning to ride the bicycle, these wheels may be moved up higher and higher so as not to be a hindrance.

The invention is illustrated in the accompanying drawing, in which—

Fig. 1 is a side view of the rear portion of a bicycle equipped with a stabilizer made in accordance with my invention, the stabilizer being shown in its lowest adjustment, as for a beginner;

Fig. 2 is a rear view of Fig. 1, showing that the right hand stabilizer assembly is a counterpart of that provided on the left side, and Figs. 3 and 4 are a plan and a side view, respectively, of one of the one-piece sheet metal attaching brackets, on a larger scale.

The same reference numerals are applied to corresponding parts in these three views.

Referring to the drawing, the reference numeral 6 designates a bicycle, on the rear axle 7 of which the stabilizer assemblies of my invention, indicated generally by the reference numerals 8 and 9, are secured, assembly 8 on the left hand side and assembly 9 on the right hand side, the assembly 9 being the counterpart of assembly 8. Each assembly consists of an attaching and supporting or clamping bracket 10, a standard 11, and an outboard wheel or roller 12. The bracket 10, in accordance with my invention, is stamped and formed from a single piece of sheet metal to provide a torque assuming radius arm 13 reaching forwardly from the main body portion 14 and having inwardly bent lugs 15 at its forward extremity on its upper and lower edges to straddle the horizontal bar 16 of the rear fork associated therewith, and thus positively prevent turning of the bracket as a whole around the axle 7 as a center. The main body portion 14 has a hole 17 therein through which the end portion of the axle 7 is arranged to extend. The body portion 14 is bent at right angles, at 18, to define a vertical end wall 19, and is bent again at right angles, as at 20, to define an outer vertical wall 21 of a vertical guide 22 in which the upper end portion 23 of the standard 11 is slidable for vertical adjustment of the outboard wheel 12. The standard 11 is made of square rod material, and its outwardly bent lower end portion 24 is formed to provide an integral axle portion 25 on the outer end thereof for the wheel 12, while the vertical upper end portion 23 has its flat opposite sides 26 disposed in surface to surface abutment with the inner and outer side walls of the guide 22, whereby positively to prevent turning of the standard when the nut 27 on the axle 7 is tightened. The outer side wall 21 is bent inwardly, as at 28, to define another wall 29 for the guide 22 opposite the end wall 19, more closely to confine the standard 11 in the guide 22 and enable tighter and more rigid clamping. There is another bend at 30 to define the clamping pad portion 31 in spaced parallel relation to the inner wall of the guide 22, this pad portion having a hole 32 provided therein in register with the hole 17 through which the axle 7 extends, as shown in Fig. 1. A cotter pin 33 entered through a hole in the outer end of the axle portion 25 on each standard 11 cooperates with washers 34 to prevent outward displacement of the wheel 12.

In operation, the nuts 27 are removed from the axle 7 to permit application of the stabilizer assemblies 8 and 9 to the opposite ends of the axle on opposite sides of the bicycle. Lugs 15 straddle the horizontal bars 16 of the rear fork to prevent turning of the brackets 10 around the axle 7 as a center so that the standards 11 carrying wheels 12 will be quite rigid and the wheels will accordingly be adequately supported to perform the stabilizing function. The nuts 27 are replaced on the opposite ends of the axle and are tightened only after the standards 11 have been adjusted up or down to dispose the wheels 12 on both sides of the bicycle at exactly the desired elevation. After the child has learned to balance the bicycle well enough so that there will be less danger of tipping, the standards 11 can be adjusted a little higher, and, in that way, the wheels 12 will not constitute a hindrance to the freedom of operation of the bicycle, further upward adjustments of the standards being made as further progress is shown. The present construction, involving frictionally clamping the square upper end portions of the standards, is infinitely adjustable, so that the standards may be raised or lowered to exactly the position desired. Eventually, when the child for whom they were purchased has learned to ride without relying upon or needing the protection of the stabilizers, the stabilizer assemblies can be removed and either discarded or presented to someone else, inasmuch as they represent such a small investment. The fact that the assemblies 8 and 9 are separate and independent is of advantage not only from the cost standpoint, but also from the standpoint of better appearance on the bicycle and less inconvenience to the child, especially when there is a rear luggage carrier, over which the upper end portion of an inverted U-shaped yoke would have to extend if the standards were provided as integral arms of such a yoke, as in some prior constructions. In conclusion, the fact that the rear axle 7 is used for the mounting of the brackets 10 is of great advantage, because it avoids the need for marring the finish on the bicycle frame, and makes double use of the nuts 27 on the axle.

It is believed the foregoing description conveys a good understanding of the objects and advantages of my invention. The appended claims have been drawn to cover all legitimate modifications and adaptations.

I claim:

1. As an article of manufacture, a sheet metal bracket comprising a main body portion having an elongated radius arm extending from its one end which arm terminates in a forked portion opening laterally therefrom adapted for reception of a bar on one side of a bicycle rear fork, the other end portion of said body portion being bent upon itself so as to define a clamping loop adapted to receive a wheel supporting standard, the body portion and its bent end portion having registering openings provided therein adapted to receive the rear axle of the bicycle.

2. Supporting means for bicycles and like vehicles comprising a bracket adapted to be secured on one end of an axle of the vehicle by means of the nut that is threaded thereon, said bracket having a hole provided therein through which the axle is arranged to project and also having means adapted to be connected to a portion of the vehicle frame in nearby spaced relation to the axle to prevent angular displacement of the bracket around said axle as an axis, a substantially vertical standard of L-shape carrying an outboard wheel on the outer end of the substantially horizontal outwardly reaching leg thereof, and clamping means adapted to engage said standard attachable with the bracket to the axle and utilizing the aforesaid nut threaded on said axle as the tightening means therefor for rigidly clamping the substantially vertical leg of said standard to said bracket with freedom for infinite vertical adjustment relative to said bracket so as to support the outboard wheel at a selected elevation.

3. Supporting means as set forth in the preceding claim wherein the vertical leg of said standard has a flat formed thereon for abutment by one of the clamping means and bracket to prevent rotation of the standard about a vertical axis from an operative position in which the horizontal leg of the standard is substantially parallel to the vehicle axle.

4. Supporting means for bicycles and like vehicles comprising an elongated bracket adapted to be secured at one end on one end of an axle of the vehicle by means of the nut that is threaded thereon and formed at the other end for abutment with a nearby portion of the vehicle frame to prevent angular displacement of the bracket around said axle as a center, said bracket having at the axle receiving end a generally U-shaped clamp portion having registering holes in the arms of the U through which the axle is arranged to project so that when the nut threaded on the axle is tightened against the same it serves both to secure the bracket in place and to compress the clamp portion, and a substantially vertical standard of L-shape carrying an outboard wheel on the outer end of the substantially horizontal outwardly reaching leg thereof, the substantially vertical leg of said standard being slidably received in and adjustably but rigidly clamped in the clamp portion of said bracket maintaining the wheel at a selected elevation.

5. Supporting means for a bicycle and like vehicle adapted to be detachably applied to the outer end of the rear axle of the vehicle and adjustably fixed to the rear fork portion of said vehicle by means of a fastening nut threaded on said rear axle, said supporting means comprising a generally L-shaped structure, whose horizontal leg portion includes an auxiliary axle member disposed below and outwardly from the end of the vehicle rear axle and carrying an outboard wheel on the outer end portion thereof at a selected elevation off the ground depending upon the vertical adjustment given said auxiliary axle member, the vertical leg portion of said structure including a bracket member supporting the outboard wheel and its axle and adjustably fixed by clamping engagement with said rear fork portion of said vehicle and held in such engagement by said nut when the same is tightened on said vehicle axle, one of said auxiliary axle and bracket members being freely adjustable vertically relative to said vehicle rear axle when said nut is loosened, whereby said outboard wheel may be adjusted to a selected elevation.

6. Supporting means for bicycles and the like vehicles comprising a bracket adapted to be secured on one end of an axle of the vehicle by means of the nut that is threaded thereon, said bracket having a hole provided therein through which the axle is arranged to project and also having means adapted to be connected to a portion of the vehicle frame in nearby spaced relation to the axle to prevent angular displacement of the bracket around said axle as an axis, a generally upright standard of generally L-shape carrying an outboard wheel on the outer end of the substantially horizontal outwardly reaching leg thereof, and securing means adapted to engage said standard attachable with the bracket to the axle and utilizing the aforesaid nut threaded on said axle as the tightening means therefor for rigidly securing the substantially vertical leg of said standard to said bracket with freedom for infinite vertical adjustment relative to said bracket so as to support the outboard wheel at a selected elevation.

7. Supporting means for bicycles and like vehicles comprising a bracket adapted to be secured on one end of an axle of the vehicle by means of the nut that is threaded thereon, said bracket having a hole provided therein through which the axle is arranged to project and also having means adapted to be connected to a portion of the vehicle frame in nearby spaced relation to the axle to prevent angular displacement of the bracket around said axle as an axis, a substantially vertical standard of L-shape carrying an outboard wheel on the outer end of the substantially horizontal outwardly reaching leg thereof, and means attachable with the bracket to the axle and utilizing the aforesaid nut threaded on said axle as the tightening means therefor for rigidly securing the substantially vertical leg of said standard to said bracket maintaining the outboard wheel at a selected elevation.

8. Supporting means for bicycles and like vehicles comprising a bracket member adapted to be secured on one end of an axle of the vehicle by means of the nut that is threaded thereon, said bracket member having a hole provided therein through which the axle is arranged to project and also having means adapted to be connected to a portion of the vehicle frame in nearby spaced relation to the axle to prevent angular displacement of the bracket member around said axle as an axis, and an auxiliary axle member disposed horizontally below and alongside the vehicle axle and carrying an outboard wheel on the outer end thereof at a selected elevation off the ground depending upon the vertical adjustment given said auxiliary axle member, said bracket member supporting the outboard wheel and its axle and adjustably fixed by clamping engagement with the frame of the vehicle and held in such engagement by said nut when the same is tightened on said axle, one of said bracket and auxiliary axle members being freely adjustable vertically relative to said axle when said nut is loosened, whereby said outboard wheel may be adjusted to a selected elevation.

9. Supporting means for bicycles and like vehicles comprising a bracket member adapted to be secured on one end of an axle of the vehicle by means of the nut that is threaded thereon, said bracket member having means adapted to be connected to a portion of the vehicle frame near the axle to prevent angular displacement of the bracket member from operative position relative to the frame, and an auxiliary axle member carried by the bracket member and disposed horizontally below and alongside the vehicle axle and carrying an outboard wheel on the outer end thereof at a selected elevation off the ground depending upon the vertical adjustment given said auxiliary axle member, said bracket member supporting the outboard wheel and its axle and adjustably fixed by clamping engagement with the frame of the vehicle and held in such engagement by said nut when the same is tightened on said axle, one of said bracket and auxiliary axle members being freely adjustable vertically relative to said axle when said nut is loosened, whereby said outboard wheel may be adjusted to a selected elevation.

10. Supporting means as set forth in claim 9 wherein the vertical leg of said standard has a flat formed thereon for abutment by one of the clamping means and bracket to prevent rotation of the standard about a vertical axis from an operative position in which the horizontal leg of the standard is substantially parallel to the vehicle axle.

11. Supporting means as set forth in claim 4, wherein the arms of the U-shaped clamp portion on the bracket are substantially parallel and the vertical leg of the standard has substantially parallel flats formed on opposite sides thereof for abutment therewith to prevent rotation of the standard about a vertical axis.

12. Supporting means for bicycles and like vehicles having a rear wheel axle comprising a generally U-shaped clamp bracket adapted to be secured on one end of the rear wheel axle of the vehicle by means of the nut that is threaded thereon, said clamp bracket having registering holes in the arms of the U through which the rear wheel axle is arranged to project so that when the nut threaded on the axle is tightened against the same it serves both to secure the bracket in place and to compress the same, an outboard wheel, and a wheel supporting axle carried on a supporting means which includes an upright, which is slidably received in and adjustably clamped by said bracket.

13. As an article of manufacture, a sheet metal bracket comprising a main body portion having an elongated radius arm extending from its one end, which arm is formed for connection with a bar on one side of a bicycle rear fork, the other end portion of said body portion being bent upon itself so as to define a clamping loop adapted to receive a wheel supporting standard, the body portion and its bent end portion having registering openings provided therein adapted to receive the rear axle of the bicycle.

14. Supporting means for a bicycle and like vehicle adapted to be detachably applied to the outer end of the rear axle of the vehicle and adjustably fixed to the rear fork portion of said vehicle by means of a fastening nut threaded on said rear axle, said supporting means comprising a generally L-shaped structure, whose horizontal leg portion includes an auxiliary axle member disposed below and outwardly from the end of the vehicle rear axle and carrying an outboard wheel on the outer end portion thereof at a selected elevation off the ground depending upon the vertical adjustment given said auxiliary axle member, the vertical leg portion of said structure including a bracket member supporting the outboard wheel and its axle and adjustably fixed by clamping engagement with said rear fork portion of said vehicle and held in such engagement by said nut when the same is tightened on said vehicle axle, one of said auxiliary axle and bracket members being freely adjustable vertically relative to said vehicle rear axle when said nut is loosened, whereby said outboard wheel may be adjusted to a selected elevation, the vertical leg portion of said L-shaped structure also including means on one of said bracket and auxiliary axle members adapted to have abutment with a nearby portion of said fork in spaced relation to the vehicle axle to prevent angular displacement of said structure about the vehicle axle as a center.

CLYDE R. KUTIL.

REFERENCES CITED

The following references are of record in the file of this patent:

UNITED STATES PATENTS

| Number | Name | Date |
|---|---|---|
| Re. 22,824 | Morehouse | Dec. 24, 1946 |
| 581,575 | Douglass | Apr. 27, 1897 |
| 609,174 | Thurston | Aug. 16, 1898 |

FOREIGN PATENTS

| Number | Country | Date |
|---|---|---|
| 689,864 | France | June 3, 1930 |
| 703,084 | France | Feb. 2, 1931 |